United States Patent [19]

Reitsma

[11] 3,845,290

[45] Oct. 29, 1974

[54] DECIMAL-TO-BINARY CONVERTER

[75] Inventor: Jogchum Reitsma, Beekbergen, Netherlands

[73] Assignee: U. S. Philips Corporation, New York, N.Y.

[22] Filed: Apr. 20, 1973

[21] Appl. No.: 352,874

[30] Foreign Application Priority Data

May 4, 1972 Netherlands .................. 7206062

[52] U.S. Cl. ...................... 235/155, 340/347 DD

[51] Int. Cl. ...................................... H03k 13/24

[58] Field of Search ............ 235/155; 340/347 DD

[56] References Cited

UNITED STATES PATENTS

| | | | |
|---|---|---|---|
| 2,411,540 | 11/1946 | Haigh | 235/155 |
| 2,894,686 | 7/1959 | Holmes | 235/155 |
| 3,001,706 | 9/1961 | Trussell | 235/155 |
| 3,008,638 | 11/1961 | Handler et al. | 235/155 |
| 3,018,955 | 1/1962 | Mendelson | 235/155 |
| 3,042,902 | 7/1962 | Weida et al. | 235/155 X |
| 3,185,825 | 5/1965 | McDonald et al. | 235/155 |
| 3,524,976 | 8/1970 | Wang | 235/155 |
| 3,579,267 | 5/1971 | Wright | 340/347 DD X |

*Primary Examiner*—Charles D. Miller
*Attorney, Agent, or Firm*—Frank R. Trifari

[57] ABSTRACT

A digital decimal number is converted into a binary number by starting from the most signigicant digit, successively adding the coded digits to the part of the number which has been coded and which is multiplied by 10. The multiplication by 10 is effected as an addition of 8*x* and 2*x* the already coded part of the number, the multiplications by 8 and 2 being realized as shift operations over three bits and one bit, respectively. The addition of the newly added digit is effected by coding it in the bit locations which are vacated by the shift operations, any remaining bit being translated into an input carry.

2 Claims, 2 Drawing Figures

| | | | m | | n | m-1 | | n-1 | | carry | | |
|---|---|---|---|---|---|---|---|---|---|---|---|---|
| 3 → 2 | : | | 2 | + | 1 | 1 | + | 0 | + | 1 | = | 2 |
| 5 → 2 | : | | 4 | + | 1 | 3 | + | 0 | + | 1 | = | 4 |
| 6 → 2 | : | | 4 | + | 2 | 3 | + | 1 | + | 1 | = | 5 |
| 9 → 2 | : | | 8 | + | 1 | 7 | + | 0 | + | 1 | = | 8 |
| 10 → 2 | : | | 8 | + | 2 | 7 | + | 1 | + | 1 | = | 9 |
| 12 → 2 | : | | 8 | + | 4 | 7 | + | 3 | + | 1 | = | 11 |
| 20 → 2 | : | | 16 | + | 4 | 15 | + | 3 | + | 1 | = | 19 |
| 24 → 2 | : | | 16 | + | 8 | 15 | + | 7 | + | 1 | = | 23 |
| 4 → 3 | : | | 3 | + | 1 | 2 | + | 0 | + | 1 | = | 3 |
| 10 → 3 | : | | 9 | + | 1 | 8 | + | 0 | + | 1 | = | 9 |
| 12 → 3 | : | | 9 | + | 3 | 8 | + | 2 | + | 1 | = | 11 |

Fig.1

DECIMAL-TO-BINARY CONVERTER

The invention relates to a device for recoding a number consisting of successive digits from a higher radix to a lower radix. The device comprises an output register in which, after the recoding of a series of high order digits of the number, the part of the number which is recoded according to the lower radix can be stored, an adder in which at least an *m*-multiple and an *n*-multiple of the recoded part of the number can be added, the sum of *m* and *n* being equal to the higher radix, *m* and *n* themselves being integer powers of the lower radix the device also comprises an add input on which a digit of next lower significance of the number to be recoded can be received. Devices of this kind are generally used, inter alia because the input and output of information in a data processing device are usually organised in the decimal system, while the processing device itself, for example, a computer, is usually designed to operate in the binary system. This example will be mainly described below, but it will be obvious that the invention can also be used for other combinations of higher and lower radices. The procedure is as follows: the most significant digit of the number is coded to binary and is subsequently multiplied by 10. The simplest procedure is to add the result of the recoding eight times ($2^3$) and twice ($2^1$), because then only translation operations are required for the multiplication. Subsequently, the next lower digit is recoded and is added to the sum then obtained. This procedure continues until the complete number has been recoded, or at least a sufficient series of digits thereof. The said additions can be performed in parallel or series. Consequently, two additions must be performed for each digit to be recoded, which is time consuming. These additions can be performed simultaneously if use is made of an adder which comprises three inputs and which is thus capable of adding three numbers in a single operation. An adder of this kind, however, is comparatively complex. The said drawbacks are eliminated according to the invention, which is characterized in that an auxiliary coding unit is provided in which the digit of next lower significance can be recoded into at least two parts which are coded according to the lower radix and which have maximum values of $m-1$ and $n-1$, respectively, it being possible to apply the said parts, together with the said *m*-multiple and *n*-multiple, respectively, to the adder. In this way, a two-input arithmetic unit suffices because the elements of the recoded digit of next lower significance appear each time in locations in which zeros are present in the shifted recoded parts of the number. The maximum values of the parts of the number are $n-1$ and $m-1$, respectively, so the sum thereof is $\leq n+m-2$. If the higher radix is 10, numbers in which no nines occur can thus be recoded. This can be the case, for example, if the said numbers are telephone numbers in which no nines might occur.

A further aspect of the invention is that the auxiliary coding device comprises three outputs, on two of which the said parts having the maximum values $m-1$ and $n-1$, respectively, appear, and a third output on which a third part of the next lower digit, having a maximum value of 1, can appear, said third output being connected to a lowest-order carry input of the adder. Thus, it is also possible to code digits 9 in the abovementioned case. The lowest order of the device always has a carry input which is not used further. If the processing is effected in series form, the carry input is also out of use during the processing of the element of the lowest significance of the recoded number.

The invention will be described with reference to some Figures.

FIG. 1 shows feasible recoding combinations.

Figure 2:
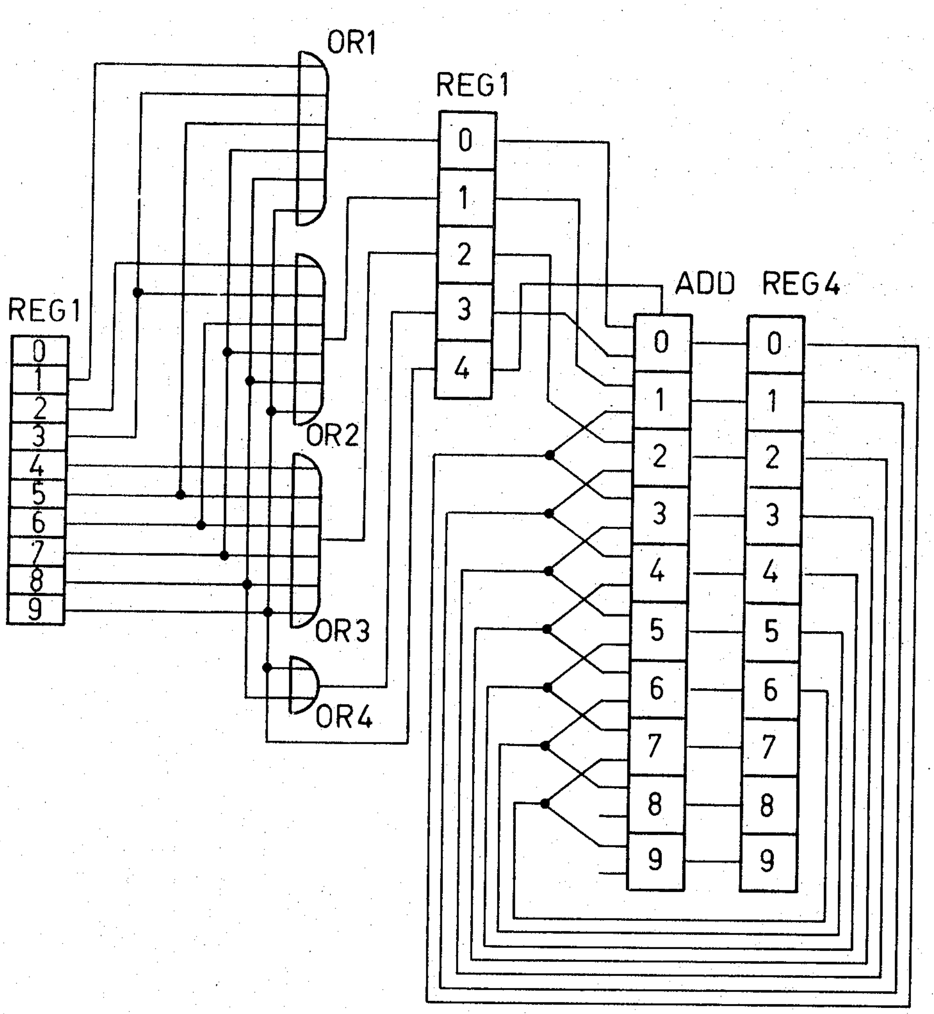
FIG. 2 shows a device for recoding according to the invention.

FIG. 1 is a table of some recoding combinations. For the recoding 3 → 2: $m = 2$ and $n = 1$. The sum of $m + n = 3$, and $m + n$ can be written as powers of 2. For $m = 2$, a shift over 1 bit location is effected, and a 1 can be inserted in the last bit location. If the said next lower digit is a 2, a bit is furthermore applied to the carry input of the lowest order.

For the recoding from 10 to 2 (decimal/to/binary): $m = 8$ ($= 2^3$) and $n = 2$ ($2^1$). For $m = 8$, a shift over three bits takes place, so that the value 7 can be inserted into the last three bit locations. For $n = 2$, a shift over one bit location is performed, so that the value 1 can be inserted into the last bit location. If the digit to be recoded is a "nine," a bit is furthermore applied to the carry input of the lowest order.

For the recoding from 10 to 3: $m = 9$ ($= 3^2$) and $n = 1$ ($3^0$). For $m = 9$, a shift over two orders is performed, so that the digit 8 can be inserted in the last two locations. If the next digit to be recoded is a "nine," one unit is furthermore applied to a carry input of the lowest order. The further examples of FIG. 1 are self-explanatory.

FIG. 2 shows a device for recoding according to the invhntion, in particular for recoding from decimal to binary. The device comprises three registers REG1, REG3 and REG4, four logic invention, OR1, 2, 3, 4, and one adder ADD. The device can furthermore comprise inputs for control pulses, for example, clock pulses. However, these inputs are not shown.

The most significant digit of the number to be recoded appears in the register REG1. In the present example, this is effected as a 1-out-of-10 code. One of the 10 stages of the register REG1 supplies a high signal, the other nine stages supplying a low signal. For example, if a "three" is applied, the output of the element denoted by 3 becomes high. The logic OR-gates OR1....4 recode this digit and store it in the elements 0....4 of the register REG3. For the digits 0....7 the conventional binary code applies. In the case of a 3, consequently, the (bistable) elements 0 and 1 of the register REG3 are set (made "one") via the logic OR-gates OR1 and OR2. If the digit is a "seven," the elements 0, 1 and 2 of the register REG3 are thus set. If the digit is an "eight," the element 3 is also set. If the digit is a "nine," all elements 0...4 are set. If the elements of the register REG3 have been set, the respective outputs become high. In reaction to a subsequent control pulse, for example, from a clock not shown, the information of the register REG3 is applied to the adder ADD, i.e., to the first three elements 0, 1 and 2 thereof. The element 0 receives the information of the elements 0 and 3 of the register REG3 on its add inputs, and receives the information of the element 4 of the register REG3 on its carry input. The adder ADD receives the information of the elements 1 and 2 of the register REG3 on one add input of the elements 1 and 2, respectively. The carry inputs of the elements 1, 2 ... of the adder ADD are each time connected in a conventional manner to the carry output of the preceding element. The add outputs of the elements of the adder ADD are connected to the respective inputs of the elements of the register REG4. The information of the digit applied to ADD is thus converted into the conventional binary code. The next digit applied is transported in the same manner from the register REG1, via the logic OR-gate OR1...4, to the register REG3. In response to the next control pulse (clock pulse) the information of the registers REG3 and REG4 is added. The information of the element 0 of REG4 is applied to element 1 and element 3 of the adder ADD, the information of the element 1 of REG4 to the elements 2 and 4 of ADD, etc. This means that the information of the register REG3 is added to ten times the contents of the register REG4, while the elements of the adder receive information each time on only two add inputs, and the element 0, in addition, on the carry input. This corresponds exactly to the number of available inputs since the adder is composed of commercially available electronic components which each time comprise one or a few of the elements of ADD. Obviously, the elements 0, 3 and 4 of the register REG1 may be interchanged according to the invention.

The concept of the invention can be utilized in a similar manner in other recoding operations. For recoding to the basic number 3, tristable elements are then required for the various registers. The number of add and carry inputs, however, remains the same. The information of the register REG4 can be output, after the supply of a control pulse, in order to be used elsewhere again. The invention can be utilized for recoding operations in series form in the same manner.

What is claimed is:

1. A device for recoding a number consisting of successive digits from a higher radix to a lower radix, comprising an output register in which, after the recoding of a series of high order digits of the number, the part of the number which is recoded according to the lower radix is stored, an adder in which at least an $m$-multiple and an $n$-multiple of the recoded part of the number are added, the sum of $m$ and $n$ being equal to the higher radix, $m$ and $n$ themselves being integer powers of the lower radix, and also comprising an add input on which a digit of next lower significance of the number to be recoded is received, an auxiliary coding unit being provided in which the digit of next lower significance is recoded into at least two parts which are coded according to the lower radix and which have maximum values of $m-1$ and $n-1$, respectively, said parts being applied, together with the said $m$-multiple and $n$-multiple, respectively, to the adder.

2. A device as claimed in claim 1, wherein the auxiliary coding unit comprises three outputs, on two of which the said parts having the maximum value $m-1$ and $n-1$, respectively, appear, and a third output on which a third part of the digit of next lower significance, having a maximum value 1, the said third output being connected to the lowest-order carry input of the adder.

* * * * *

UNITED STATES PATENT OFFICE
CERTIFICATE OF CORRECTION

Patent No. 3 845 290 Dated October 29 1974

Inventor(s) Jogchum Reitsma

It is certified that error appears in the above-identified patent and that said Letters Patent are hereby corrected as shown below:

Column 2 line 32 change "invhntion" to --invention--:

line 34 delete "invention" and insert --OR-gates--.

Signed and sealed this 15th day of July 1975.

(SEAL)
Attest:

RUTH C. MASON
Attesting Officer

C. MARSHALL DANN
Commissioner of Patents and Trademarks